United States Patent [19]
Huang et al.

[11] Patent Number: 6,154,443
[45] Date of Patent: Nov. 28, 2000

[54] FFT-BASED CDMA RAKE RECEIVER SYSTEM AND METHOD

[75] Inventors: Chia-Chi Huang; Shin-Iuan Wang; Yung-Liang Huang, all of Hsinchu, Taiwan

[73] Assignee: Industrial Technology Research Institute, Hsinchu, Taiwan

[21] Appl. No.: 09/132,859

[22] Filed: Aug. 11, 1998

[51] Int. Cl.[7] .................................................. H04J 13/00
[52] U.S. Cl. ........................................ 370/210; 375/130
[58] Field of Search .................................. 370/210, 320, 370/335, 342, 479; 375/130

[56] References Cited

U.S. PATENT DOCUMENTS

| | | | |
|---|---|---|---|
| 4,601,005 | 7/1986 | Kilvington . | |
| 4,998,111 | 3/1991 | Ma et al. . | |
| 5,629,929 | 5/1997 | Blanchard et al. | 370/201 |
| 6,009,089 | 12/1999 | Huang et al. | 370/342 |

OTHER PUBLICATIONS

Divsalar, D et al., "Improved CDMA Performance Using Parallel Interference Cancellation," *IEEE MILCOM.*, pp. 911–917 (Oct. 1994).

Povery, G.J. et al. "A Decision–Directed Spread–Spectrum RAKE Receiver For Fast–Fading Mobile Channels," *IEEE Trans. on Vehicular Technology*, V45, pp. 491–502 (Aug. 1996).

Latva–aho, Matti et al. "Parallel Interference Cancellation Receiver for DS–CDMA Systems in Fading Channels," *IEEE PIMRC*, pp. 559–564, (Sep. 1997).

*Primary Examiner*—Douglas W. Olms
*Assistant Examiner*—Kenneth Vanderpuye
*Attorney, Agent, or Firm*—Christensen O'Connor Johnson Kindness PLLC

[57] ABSTRACT

The present invention provides a CDMA RAKE receiver that computes a data detection using Fast Fourier Transform (FFT) matched filters. Signals received are processed in frequency domain by the RAKE receiver. The RAKE receiver includes a pilot signal spreading code matched filter, a data signal spreading code matched filter and a channel matched filter. The pilot signal spreading code matched filter removes a spreading code of the pilot signal. The data signal spreading code matched filter removes a multiple access spreading code of the data signal. A channel matched filter estimates the channel frequency response and combine the received data signal from different paths before a decision is made. For increasing the CDMA system capacity, the RAKE receiver uses a interference cancellation method. A downlink receiver at a mobile station estimates the interference of a pilot signal and subtracts the pilot interference from the received signal before data detection. The uplink receivers at a base station use a multi-stage parallel interference cancellation process for removing multiple access interference from other users.

32 Claims, 6 Drawing Sheets

RESERVE PATH

Fig. 6

FFT-BASED CDMA RAKE RECEIVER SYSTEM AND METHOD

FIELD OF THE INVENTION

The present invention relates generally to Code Division Multiple Access (CDMA) communications and, more particularly, to a RAKE receiver for interference cancellation of CDMA signals.

BACKGROUND OF THE INVENTION

Wireless cellular communications around the world are moving toward CDMA systems in the third generation approaches. A CDMA system has the most efficient usage of the limited radio spectrum. It has been proved that a CDMA system ideally provides a large channel capacity gain over other accesses methods such as Frequency Division Multiple Access (FDMA) and Time Division Multiple Access (TDMA). In general, a CDMA system has to use a RAKE receiver to combine the received signal energy form different paths to combat the effect of multipath fading.

A RAKE receiver implements a form of path diversity by gathering the signal energy from different paths and by optimally combing all the multipath signals together. The path diversity function provides a robust communication channel so that when one path fades, communication is still possible through a non-fading path. A CDMA RAKE receiver detects the multipath signals using either a matched filter method or a correlation method.

Conventionally, a RAKE receiver in a CDMA system uses a spreading code matched filter to despread a multiple access code and a transversal filter for channel impulse response matching. The spreading code matched filter can be implemented at IF band using a SAW filter or at baseband using a digital matched filter. After code despreading, a transversal filter which is implemented at baseband is used to combine the received signal energy form different paths. The drawback of the SAW filter approach is that a SAW filter cannot be easily integrated with the baseband transversal filter in an IC. As IC technology progresses rapidly, the digital spreading code matched filter approach is a preferred choice. Although the current IC technology can provide large computational power, it is still hard to implement a transversal filter based RAKE receiver in IC, especially when the length of the multiple access code is large.

An alternative method to implement a RAKE receiver is to use a bank of correlators. Each correlator is used to detect a received signal path separately. The number of the correlators in the correlator bank is typically three or four. Therefore, this RAKE receiver structure needs to search for three or four stronger paths in the received signal.

Both the above two RAKE receiver implementations need a sounding receiver to estimate the multipath channel impulse response. A RAKE receiver needs to know the delay time, the carrier phase shift, and the strength of the main paths. Moreover, the correlator bank implementation needs extra computations to select the main paths.

One method to increase the CDMA system capacity is to use a parallel interference cancellation (PIC), for example, as described in Dariush Divsalar and Marvin K. Simon, "Improved CDMA performance using parallel interference cancellation," IEEE MILCOM, pp. 911–917, October 1994. Although the CDMA system capacity as this paper described can be increased, their receiver is applicable to a Additive White Gaussian Noise (AWGN) channel only and is unsuitable for a multipath fading channel. Other PIC methods for a multipath fading channel have also been proposed, such as in Matti Latva-aho, Markku Juntti and Markku Heikkila, "Parallel Interference Cancellation Receiver for DS-CDMA Systems in Fading Channels," IEEE PIMRC, pp. 559–564, September 1997. However, these methods adapt a time domain signal processing approach to cancel the multiple access interference and therefore, become complicated.

SUMMARY OF THE INVENTION

The present invention overcomes the foregoing limitations by providing a CDMA RAKE receiver that computes a detection in the frequency domain by using Fast Fourier Transform (FFT) matched filters. The receiver is implemented in both downlink and uplink communications when the received signal contains both data and pilot signals. In both downlink and uplink receivers the signal detection process operates in the frequency domain. The received signal is expediently processed in frequency domain by spreading code matched filters, and a channel matched filter prior to making a decision.

Spreading code matched filters are used to despread the spreading code of a pilot signal and a data signal. A channel matched filter is used to combine the received signal from different paths before a decision is made. The channel matched filter contains a channel frequency response estimation unit which is used to compute the coefficient of the channel matched filter.

After code despreading the pilot signal is used to compute the channel frequency response estimation. There are two types of methods for channel frequency response estimation. One uses the pilot signal after code despreading for the channel frequency response estimation directly. The other one transforms the pilot signal after code despreading to the channel impulse response estimation in time domain and then reserves the main paths of the channel impulse response estimation. After the main paths are reserved, the channel impulse response estimation is transformed to the channel frequency response estimation.

Interference cancellation techniques are used to increase the CDMA system capacity. In a downlink receiver, we estimate the pilot interference. Then, the estimated pilot interference is subtracted from the received signal in frequency domain for pilot interference cancellation. In an uplink receiver, the method utilizes multi-stage parallel interference cancellation. Such multi-stage parallel interference cancellation can be used in a fast fading channel because at each stage, interference signal estimation can be obtained from both the channel frequency response estimation and a tentative decision of each user at the previous stage.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The FFT based CDMA RAKE receiver is designed for a direct sequence spread spectrum system (DSSS). The transmitted signal of this DSSS contains a data signal and a pilot signal. A data signal is modulated by using either binary phase shift keying (BPSK) or quadrature phase shift keying (QPSK) and multiplied with a multiple access spreading code (a data signal spreading code). A pilot signal is unmodulated and multiplied with a pilot signal spreading code. Then, the data signal and the pilot signal are combined to be a transmitted signal. Here the multiple access code of this DSSS and the pilot signal spreading code of this DSSS are equal-length short codes. That is, the period of a multiple access code or the period of a pilot signal spreading code is the same as the period of a transmitted symbol.

Figure 1A:
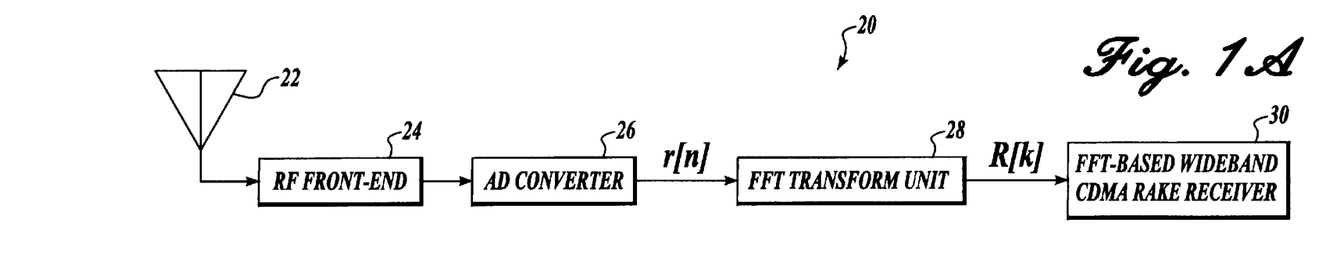
FIGS. 1A and 1B are general architectural diagrams of a CDMA RAKE, system for a downlink and uplink receiver, respectively.
Figure 1B:
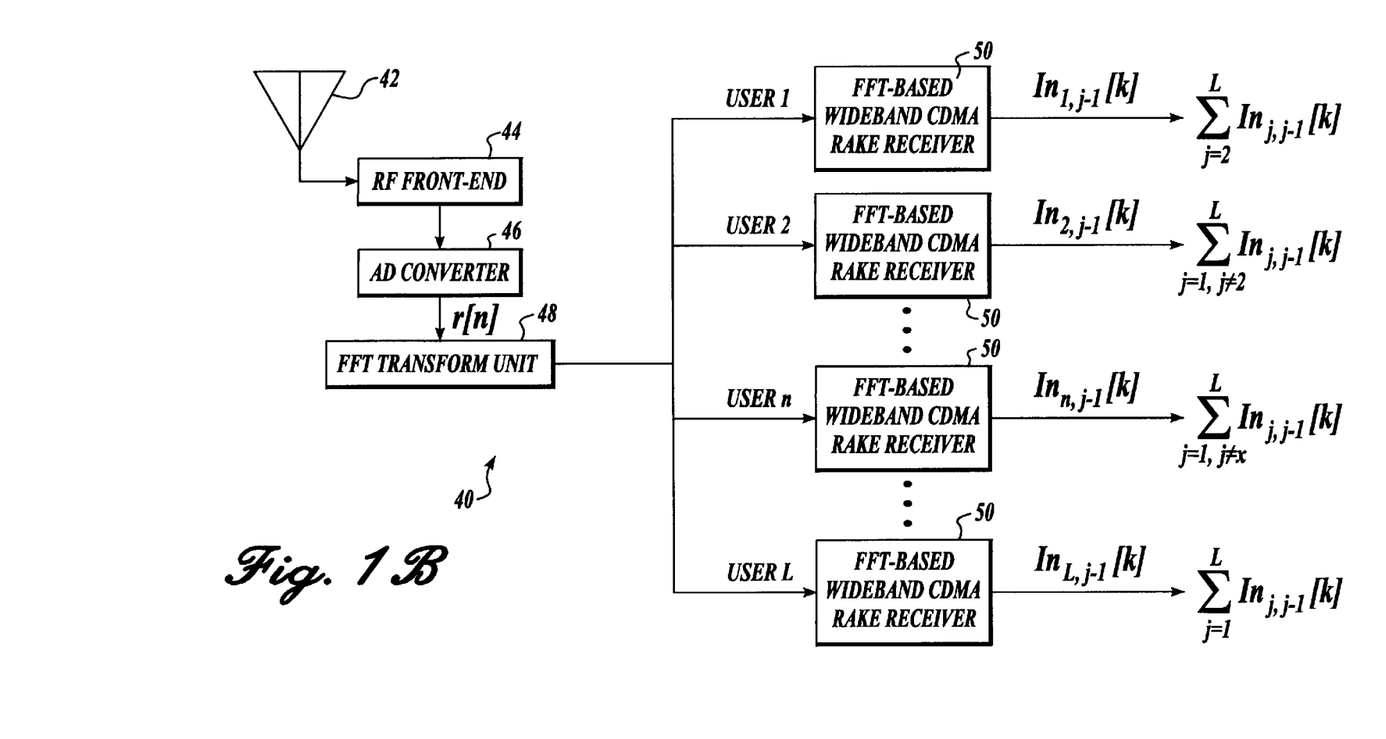

FIGS. 1A and 1B are architectural diagrams of downlink and uplink RAKE receiver systems 20 and 40 provided by the present invention. The downlink RAKE system 20 includes an antenna 22, a RF front-end 24, an analog-to-digital (AD) converter 26, a fast Fourier transform unit (FFT) 28, and a FFT-based CDMA RAKE receiver 30. The uplink RAKE receiver 40 includes the same components as the downlink RAKE receiver 20 and in addition includes a FFT-based CDMA RAKE receiver 50 for each user. A radio frequency (RF) signal is received by the antenna 22 and 42. The RF signal from the antenna enters the RF front-end 24 and 44 and converts the RF signal to an equivalent baseband complex signal (complex envelope) with a real I(t) and imaginary Q(t) component. The analog-to-digital (AD) converter 26 and 46 samples the I(t) and Q(t) components at a sampling rate of 1/Tc (or its integral multiple) to generate discrete time signals I[n] and Q[n], respectively, where Tc denotes the chip period for a spreading code. The discrete time signals I[n] and Q[n] compose an equivalent baseband discrete time complex signal r[n], where r[n]=I[n]+jQ[n]. The signal r[n] is transmitted to the FFT transform unit 28 and 48 which computes a N points FFT of the r[n], denoted by the symbol R[k], where N is the length of the pilot and data signal spreading code (or its integral multiple). The N points FFT computation is synchronized with received symbol time. The signal processing is then performed in the frequency domain. The signal R[k] is transmitted to the FFT-based CDMA RAKE receiver(s) 30 and 50.

Figure 2A:
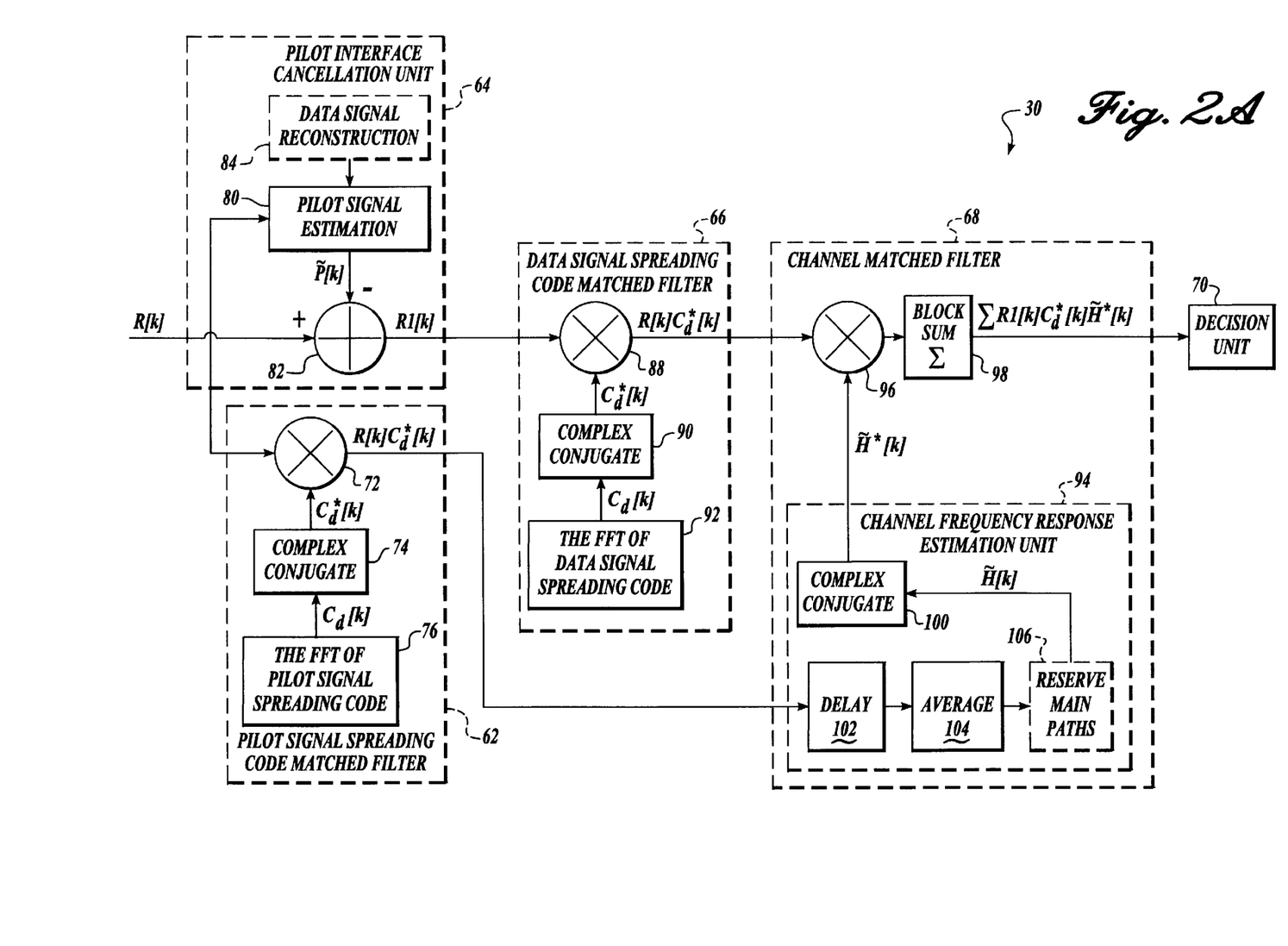
FIG. 2A is a block diagram of a downlink RAKE receiver with optional reserving main paths and data signal reconstruction.

FIG. 2A is a block diagram of a downlink RAKE receiver 30 with optional reserving main paths and data signal reconstruction. The downlink RAKE receiver 30 includes a pilot signal spreading code matched filter 62, a pilot interference cancellation unit 64, a data signal spreading code matched filter 66, a channel matched filter 68, and a decision unit 70.

The signal R[k] is transmitted from the FFT unit 28 to the pilot signal spreading code matched filter 62. The pilot signal spreading code matched filter 62 removes (despreads) the pilot signal spreading code and includes a multiplier 72, a complex conjugate unit 74, and a unit 76 for storing the FFT of the pilot signal spreading code $c_p[n]$. The FFT of $c_p[n]$ is $C_p[k]$, which can be stored in a ROM within the unit 76. The complex conjugate unit 74 computes the complex conjugate of the $C_p[k]$ to produce $C_p^*[k]$. The product of R[k] and $C_p^*[k]$ produced by the multiplier 72 removes the pilot signal spreading code to produce $R[k]C_p^*[k]$.

The R[k] is also transmitted to the pilot interference cancellation unit 64. The pilot interference cancellation unit 64 includes a pilot signal estimation unit 80 and an adder 82. The pilot signal estimation unit 80 estimates the pilot interference signal $\tilde{P}[k]$ and is described in more detail in FIGS. 4A and 4B below. The adder 82 subtracts $\tilde{P}[k]$ from the R[k] signal to cancel the pilot interference to produce R1[k]. A data signal reconstruction component 84 is an optional component that is coupled to the pilot estimation unit 80 for removing data signal effect and is described in more detail below in FIG. 5.

The data signal spreading code matched filter 66 operates similarly as the pilot signal spreading code matched filter 62 but removes (despreads) the data signal spreading code from R1[k] received from the pilot interference cancellation unit 64. The data signal spreading code matched filter 66 includes a multiplier 88, a complex conjugate unit 90, and a storage unit 92. The storage unit 92 stores the FFT of the data signal spreading code $c_d[n]$ which is $C_d[k]$ and it can be stored in ROM. The complex conjugate unit 90 computes the complex conjugate of the $C_d[k]$ to produce $C_d^*[k]$. The multiplier 88 multiplies the R1[k] with $C_d^*[k]$ to produce $R1[k]C_d^*[k]$.

The channel matched filter 68 combines the received data signal power from different paths before a decision is made. The channel matched filter 68 contains a channel frequency response estimation unit 94, a multiplier 96, and a block sum unit 98. The channel frequency response estimation unit 94 includes a complex conjugate unit 100, a delay unit 102, a block-by-block average unit 104, and an optional reserve main paths unit 106. The signal $R[k]C_p^*[k]$ from the pilot signal spreading code matched filter 62 is transmitted to the channel frequency response estimation unit 94. The $R[k]C_p^*[k]$ is delayed at the delay unit 102 for one spreading code period. Then, average unit 104 computes a weighted block-by-block average of the delayed version of the $R[k]C_p^*[k]$ to generate a channel frequency response estimation $\tilde{H}[k]$, where the block period is one spreading code period. The complex conjugate unit 100 computes the complex conjugate of the $\tilde{H}[k]$ to produce $\tilde{H}^*[k]$. The multiplier 96 multiplies the $R1[k]C_d^*[k]$ from the data signal spreading code matched filter 66 with $\tilde{H}^*[k]$ to produce $R1[k]C_d^*[k]\tilde{H}^*[k]$. The block sum unit 98 computes the total sum of the $R1[k]C_d^*[k]\tilde{H}^*[k]$ within one spreading code period, which is denoted by $$\sum R1[k]C_d^*[k]\tilde{H}^*[k].$$

The decision unit 70 receives $$\sum R1[k]C_d^*[k]\tilde{H}^*[k]$$

from the channel matched filter 68 and makes a data decision. If the data modulation of the data signal is BPSK, the decision unit determines whether the real part of the $$\sum RI[k]C_d^*[k]\tilde{H}^*[k]$$

is greater or less than 0. If the data modulation of the data signal is QPSK, the decision unit determines whether the real part of the $$\sum RI[k]C_d^*[k]\tilde{H}^*[k]$$

and the imaginary part of the $$\sum RI[k]C_d^*[k]\tilde{H}^*[k]$$

are greater or less than 0.

Figure 2B:
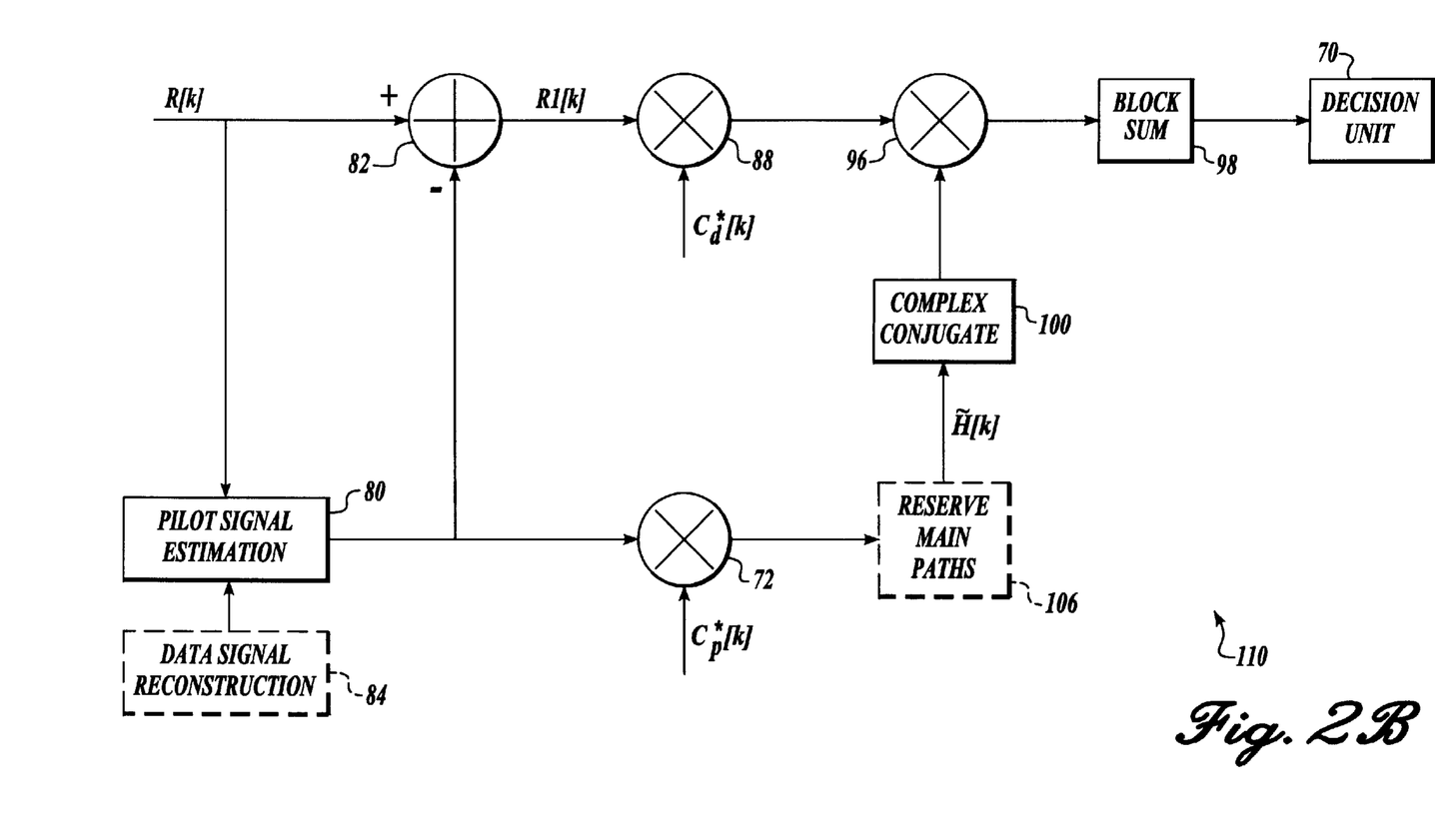
FIG. 2B is a block diagram of an alternate downlink RAKE receiver.

FIG. 2B is a block diagram of an alternate downlink RAKE receiver 110 with optional reserving main paths. In this embodiment, pilot signal estimation unit 80 is also coupled to multiplier 72. When pilot signal estimation unit 80 is coupled in this manner the delay unit 102 and the average unit 104 are no longer necessary in the channel frequency response estimation unit 94, because, as will be described later, the pilot signal estimation unit 80 already includes these components.

Figure 3A:
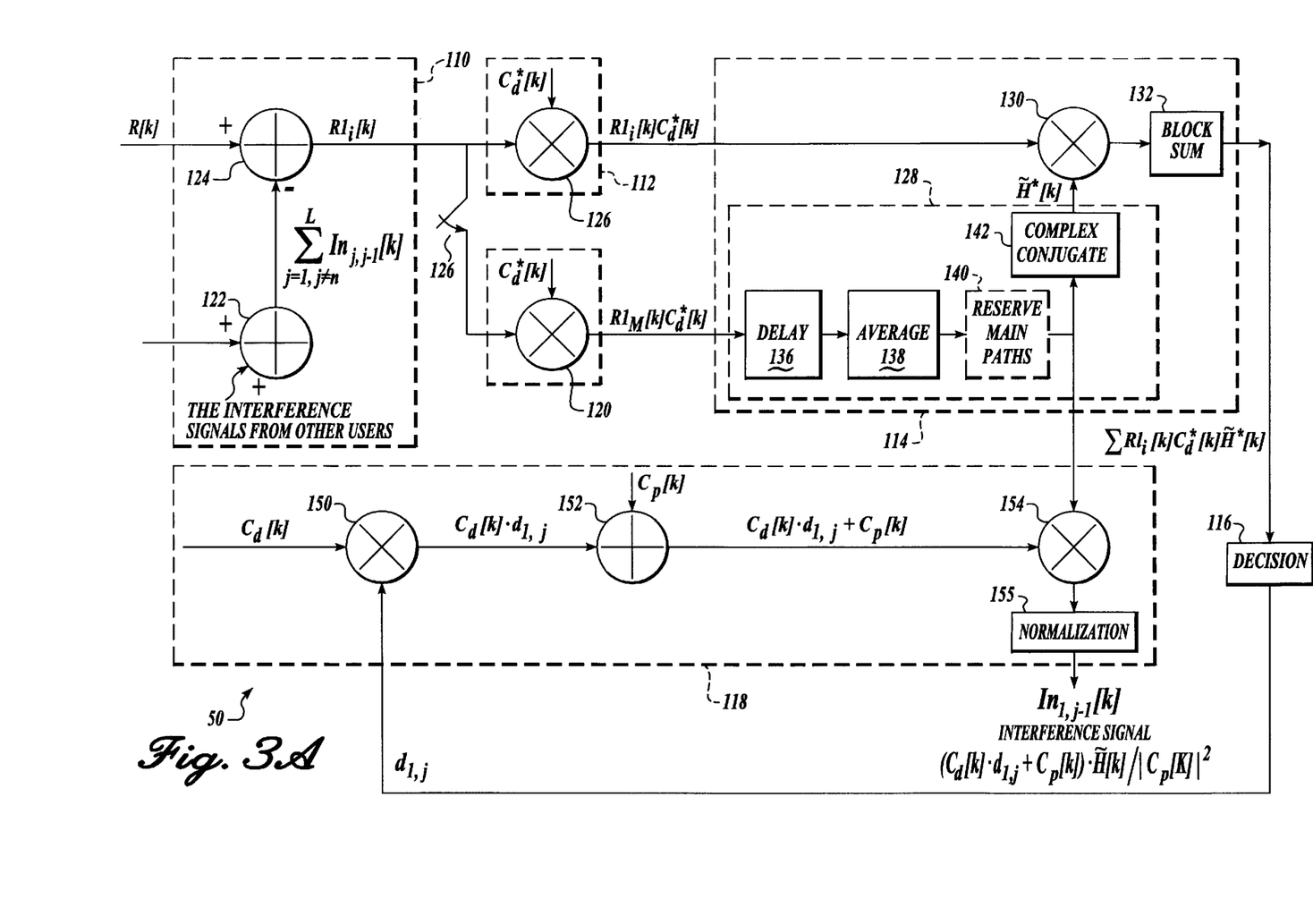
FIG. 3A is a block diagram of an uplink RAKE receiver with optional reserving main paths.

FIG. 3A is a block diagram of an uplink RAKE receiver with optional reserve main paths. The uplink RAKE receiver, as shown in FIG. 1B, can detect L number of users at the same time. Each user has the same type of the uplink CDMA RAKE receiver 50. That is, the L users share the same units from the antenna 42 to the FFT units 48, and then R[k] is transmitted to the L uplink CDMA receivers 50 for the L users detection. The uplink receiver 50 is implemented using a multi-stage parallel interference cancellation method to increase the system capacity. The multi-stage interference cancellation method is an iterative process. At each stage, the reconstructed interference signals generated by the uplink receivers 50 of other users at the previous stage of operation is subtracted from R[k] for each user. Then, the signal remaining after interference cancellation is used for data detection. After data detection, the reconstructed interference signal is generated at each users' uplink receiver and provided to the other users' uplink receivers for the next stage detection process.

As shown in FIG. 3A, the uplink receiver 50 includes a multi-user interference cancellation unit 110, a data signal spreading code matched filter 112, a channel matched filter 114, a decision unit 116, an interference signal estimation unit 118, and a pilot signal spreading code matched filter 120. Without loss of generality, the following will describe the operation of the uplink receiver for a first user, user 1 or n=1.

The multi-user interference cancellation unit 110 removes the reconstructed interference signals from other users from the signal R[k] by using a first adder 122 and a second adder 124 to generate the signal remaining after multi-user interference cancellation which is denoted by $R1_i[k]$. The index i of $R1_i[k]$ is the i'th stage of data detection of the present received symbol. The first adder 122 combines the reconstructed interference signals from other users to generate the total reconstructed interference signal represented by $$\sum_{j=2}^{L} In_{j,i-1}[k],$$

, where $In_{j,i-1}[k]$ is the reconstructed interference signal generated by the uplink receiver of the j'th user at the i-1 stage of data detection. Furthermore, all of the reconstructed interference signals ($In_{j,0}[k]$=0, j=1 ... L) are set to 0 at the first stage of data decision (i=1). After gathering the reconstructed interference signals generated from the uplink receivers of other users, the second adder 124 subtracts the signal $$\sum_{j=2}^{L} In_{j,i-1}[k]$$

from the signal R[k] to produce a signal $R1_i[k]$. The signal $R1_i[k]$ is represented by the following equation:

$$R1_i[k] = R[k] - \sum_{j=2}^{L} In_{j,i-1}[k]$$

At the i'th stage of data detection of the present received symbol, the $R1_i[k]$ is transmitted through the data signal spreading code matched filter 112, and a channel matched filter 114. The data signal spreading code matched filter 112 removes (despreads) the data signal spreading code to produce $$R1_i[k]C_d^*[k].$$

The data signal spreading code matched filter 112 is described in more detail above with respect to FIG. 2A.

The signal $$R1_i[k]C_d^*[k]$$

from the data signal spreading code matched filter 112 is transmitted to the channel matched filter 114. When i=M, M is total number of stages, switch 126 closes, thereby allowing the pilot signal spreading code matched filter 120 to produce $$R1_M[k]C_d^*[k]$$

and send it to the channel matched filter 114. The channel matched filter 114 includes a channel frequency response estimation unit 128, a multiplier 130, and a block sum unit 132. The channel frequency response estimation unit 128 includes a delay unit 136, an average unit 138, an optional reserve main paths unit 140, and a complex conjugate unit 142. $\tilde{H}[k]$, produced by average unit 138 from the output of the delay unit 136, is sent to the complex conjugate unit 142. When i=M, the output of the pilot signal spreading code matched filter 120 is sent to the delay unit 136. The delay unit 136 delays its received signal until the beginning of the next symbol processing. The complex conjugate unit 142 computes the complex conjugate of the $\tilde{H}[k]$ to produce $\tilde{H}^*[k]$. The multiplier 130 multiplies the from the data signal spreading code matched filter 112 with $\tilde{H}^*[k]$ from the complex conjugate unit 142 to produce the $$RI_i[k]C_d^*[k]\tilde{H}^*[k].$$

Again, the block sum unit 132 computes the total sum of the $$RI_i[k]C_d^*[k]\tilde{H}^*[k]$$

within one spreading code period, which is denoted by the symbol $$\sum RI_i[k]C_d^*[k]\tilde{H}^*[k].$$

The decision unit 116 receives the block sum from the channel matched filter 114 and makes a data decision. If the data modulation of the data signal is BPSK, the decision unit determines whether the real part of the $$\sum RI_i[k]C_d^*[k]\tilde{H}^*[k]$$

is greater or less than 0 and generates a tentative decision $d_{1,i}$ of the present received symbol. If the data modulation of the data signal is QPSK, the decision unit determines whether the real part of the $$\sum RI_i[k]C_d^*[k]\tilde{H}^*[k]$$

and the imaginary part of the $$\sum RI_i[k]C_d^*[k]\tilde{H}^*[k]$$

is greater or less than 0 and generates a tentative decision $d_{1,i}$. In the QPSK example, the generated tentative decision $d_{1,i}$ is a complex signal.

At the i'th stage of data detection for the present received symbol, the signal $\tilde{H}[k]$ from the channel frequency response estimation unit 128 and the tentative decision $d_{1,i}$ of the present symbol from the decision unit 116 are transmitted to an interference signal estimation unit 118 for producing the reconstructed interference signal. The interference signal estimation unit 118 is used to reconstruct the transmitted symbol of the user, which is the multiple access interference of user 1 to be used by the other users' uplink receivers. The reconstructed interference signal of user 1 is transmitted to the other users' uplink receivers for multi-user interference cancellation. The interference signal estimation unit 118 includes a first multiplier 150, an adder 152, a second multiplier 154, and a normalization unit 155. The first multiplier 150 multiplies the FFT of the data signal spreading code $C_d[k]$ with the signal $d_{1,i}$ from the decision unit 116 to generate the data modulated data signal spreading code $C_d[k]d_{1,i}$. The adder 152 combines the FFT of the pilot signal spreading code with the signal $C_d[k]d_{1,i}$ to generate $C_p[k]+C_d[k]\cdot d_{1,i}$. The second multiplier 154 multiplies the $C_p[k]+C_d[k]\cdot d_{1,i}$ from the adder 152 with the $\tilde{H}[k]$ from the channel frequency response estimation unit 128 to produce $(C_p[k]+C_d[k]\cdot d_{1,i})\cdot \tilde{H}[k]$. Since the channel frequency response estimation $\tilde{H}[k]$ is weighted by the $|C_p[k]|^2$ due to the pilot signal spreading code matched filter 120, the normalization unit 155 is used to remove the weighting factor $|C_p[k]|^2$. The normalization unit 155 normalizes the output of the second multiplier 154 by $|C_p[k]|^2$ to generate the reconstructed interference signal denoted by the $\text{In}_{1,i}[k]$. The signal $\text{In}_{1,i}[k]$ is represented by the following equation:

$$\text{In}_{1,i}[k]=(C_p[k]+C_d[k]\cdot d_{1,i})\cdot \tilde{H}[k]/|C_p[k]|^2$$

The uplink RAKE receiver 50 does M stages of data detection for each received symbol, that is, after M times of data detection, the uplink receiver will process the next symbol for data detection in a similar way.

At the M'th stage of data detection of the present received symbol (the last time of data detection of the present received symbol), the switch 126 closes and the signal $R1_M[k]$ is transmitted from the multi-user interference cancellation unit 110 to the pilot signal spreading code matched filter 120. The pilot signal spreading code matched filter 120 removes (despreads) the pilot signal spreading code and produces a $$R_M[k]C_p^*[k]$$

signal. The signal $$R_M[k]C_p^*[k]$$

is transmitted to the channel frequency response estimation unit 128 within the channel matched filter 114 for channel frequency response estimation.

Figure 3B:
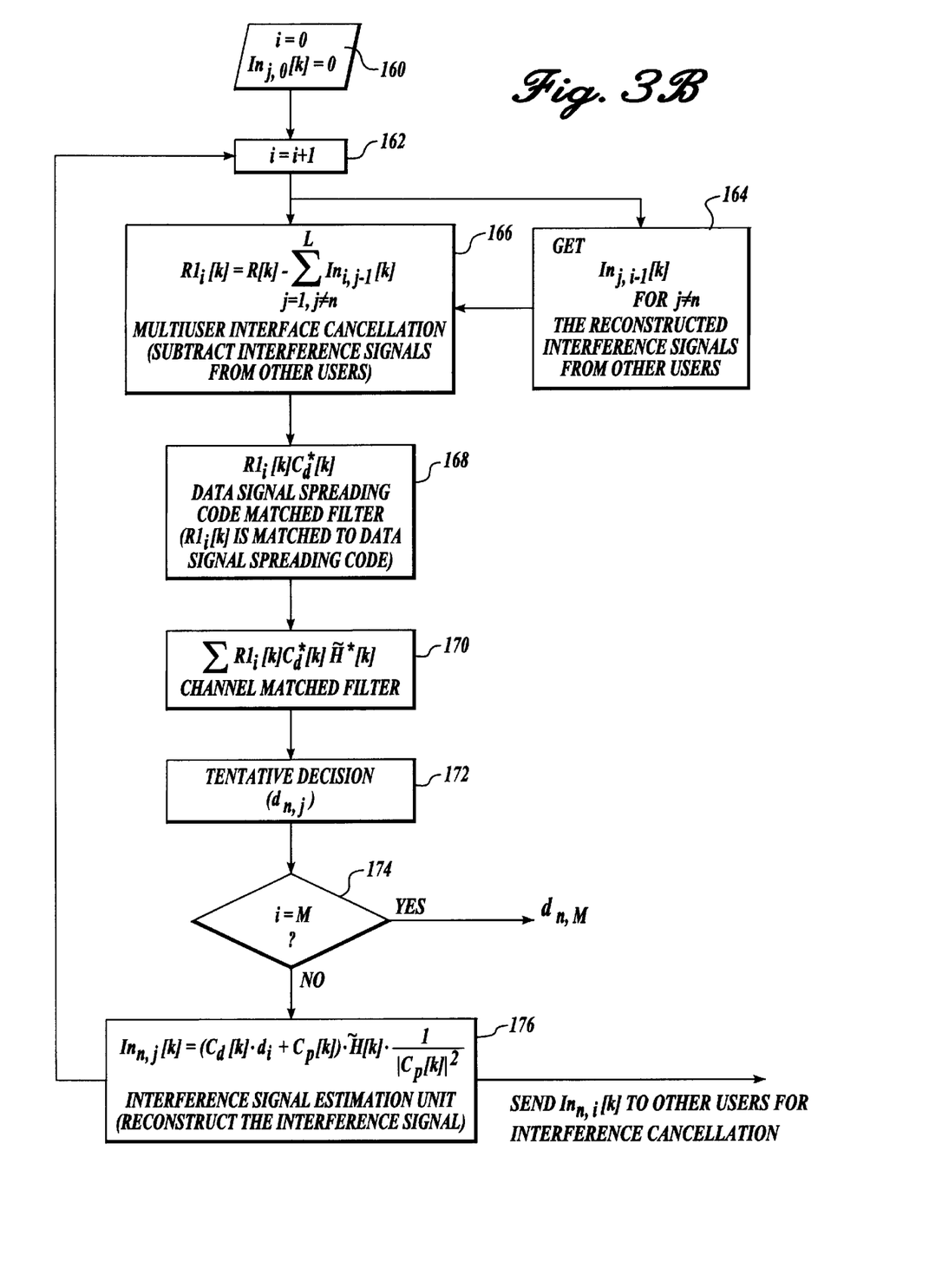
FIG. 3B is a data detection flowgraph of the uplink RAKE receiver for the receiver shown in FIG. 3A.

FIG. 3B is a non-user specific data detection flowgraph (use user n as an example) of the uplink receiver shown in FIG. 3A. At step 160, for each received symbol, the uplink receiver 50 initializes i=0 and sets all of the reconstructed interference signals from other users to 0 ($\text{In}_{j,0}[k]$=0, j=1 ... L). At step 162, the index i of data detection stage is incremented by one, denoted by the equation i=i+1. At step 164, the receiver 50 gets or receives the reconstructed interference signals $\text{In}_{j,i-1}[k]$ generated from other users. At the first stage of data detection, the uplink receiver of user n does not receive the reconstructed interference signal ($\text{In}_{j,0}[k]$) from other users. The uplink receiver of user n sets the reconstructed interference signal ($\text{In}_{j,0}[k]$) to 0 at the first stage of data detection of the present received symbol. After the first stage of data detection of the present received symbol, the uplink receiver of the user n receives the reconstructed interference signals from other users which are generated at the previous stage of data detection. At step 166, the reconstructed interference signals from other users are subtracted from R[k] as stated in the following equation:

$$RI_i[k] = R[k] - \sum_{j=1, j\neq n}^{L} \text{In}_{j,i-1}[k].$$

At step 168, $R1_i[k]$ is multiplied with the complex conjugate of the FFT of data signal spreading code to generate $$RI_i[k]C_d^*[k].$$

At step 170, the output of the step 168 is matched to the channel frequency response estimation to generate $$\sum RI_i[k]C_d^*[k]\tilde{H}^*[k].$$

At step 172, a tentative decision $d_{n,i}$ is made for the present received symbol. If at decision step 174 the i'th data detection stage equals the last stage of data detection M, the tentative decision is $d_{n,M}$. Otherwise, at step 176, the reconstructed interference signal of user n at the i'th stage of data detection is computed and then sent to the uplink receivers of the other users, where the reconstructed interference signal of the users n is represented by the equation $In_{n,i}[k]= (C_p[k]+C_d[k]\cdot d_{n,i})\cdot \tilde{H}[k]/|C_p[k]|^2$. The data detection process is then looped back to the step 162 where the index i is incremented by one for the next stage data detection of the present received symbol.

Figure 4A:
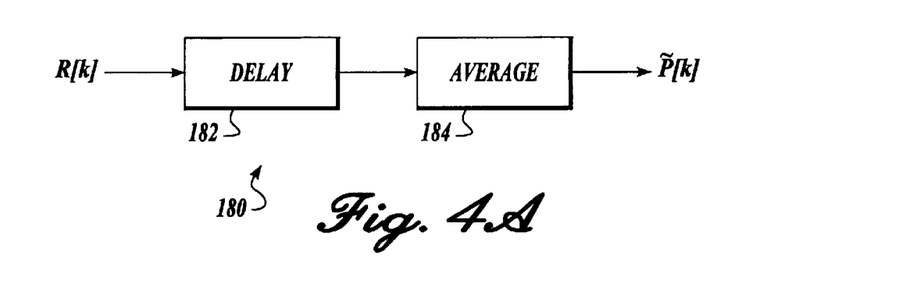
FIGS. 4A and 4B are block diagrams illustrating different pilot signal estimations performed in the downlink RAKE receivers shown in FIGS. 2A and 2B.

FIG. 4A illustrates a pilot signal estimation unit 180 for low speed users. The received R[k] signal is delayed at a delay unit 182 for one spreading code period. Since the pilot signal is fixed, that is, it is unmodulated, a simple block-by-block average of the R[k] estimates the pilot interference. An average unit 184 then computes a weighted block-by-block average of the R[k] signal to generate the pilot interference $\tilde{P}[k]$, where the block period is one spreading code period. This setup is effective in a low speed system, because the averaging can be performed over a long period of time.

Figure 4B:
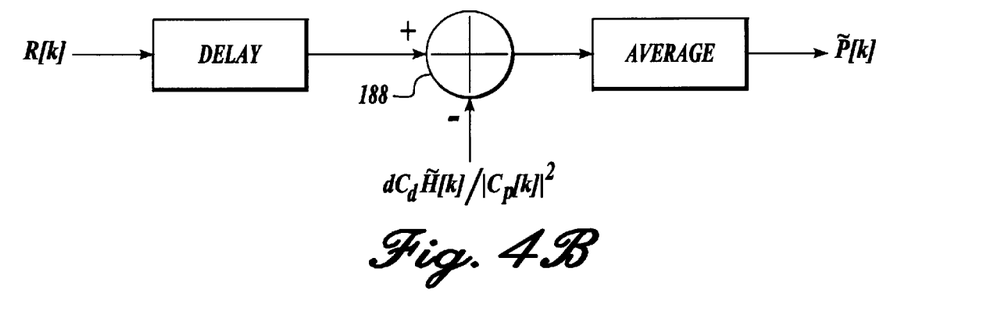

FIG. 4B illustrates a pilot signal estimation unit 186 for high speed users. A summer 188 is included between the delay unit and the average unit. The summer 188 removes data signal component $d\cdot C_d[k]\cdot\tilde{H}[k]/|C_p[k]|^2$ from the delayed signal. The data signal component is reconstructed by the data signal reconstruction unit 84 described in FIG. 5 below. Since the average length of the signal is not large enough with respect to high speed users, the reconstructed data signal component must be removed for pilot signal estimation to avoid "data signal cancellation."

Figure 5:
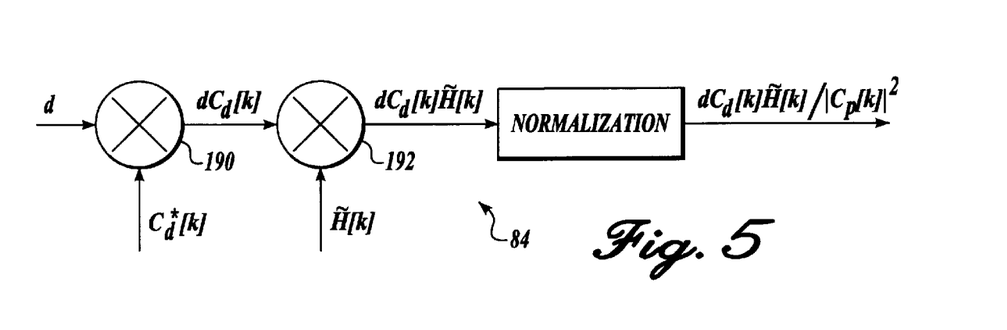
FIG. 5 is a block diagram of data signal reconstruction optionally performed in the downlink RAKE receiver shown in FIG. 2A and 2B.

As shown in FIG. 5, the data signal reconstruction unit 84 includes a first and second multiplier 190 and 192 and a normalization unit 194 for reconstructing the data signal using a decision feedback method. The first multiplier 190 multiplies the data detection output of the previous received symbol d with the FFT of the data signal spreading code $C_d[k]$ to generate $d\cdot C_d[k]$. The second multiplier 192 multiplies $d\cdot C_d[k]$ with the channel frequency response estimation $\tilde{H}[k]$ that is then normalized by normalization unit 194 to generate the reconstructed data signal component of the previous received symbol, $d\cdot C_d[k]\cdot\tilde{H}[k]/|C_p[k]|^2$.

Figure 6:
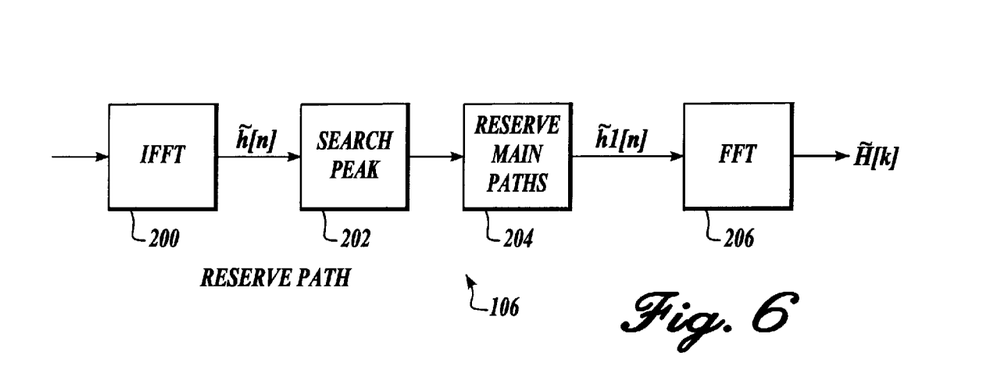
FIG. 6 is a block diagram of reserve main paths optionally performed in the RAKE receivers shown in FIGS. 2A, 2B and 3A.

As shown in FIG. 6, the reserve main paths unit 106 includes an Inverse Fast Fourier Transform (IFFT) unit 200, a search peak unit 202, a selecting unit 204, and a FFT unit 206. The IFFT unit 200 receives the signal from the pilot signal spreading code matched filter 62 or the average unit 104 or the average unit 138, see FIGS. 2B, 2A and 3A, respectively, and computes the IFFT, thereby generating the channel impulse response estimation denoted by the symbol $\tilde{h}[n]$. The search peak unit 202 receives $\tilde{h}[n]$ from the IFFT unit 200 and searches or determines the peak amplitude of $\tilde{h}[n]$. Then, the select path unit 204 selects signals with high amplitudes from $\tilde{h}[n]$ and discards the remaining signals that have low amplitudes by setting the low amplitude signals to zero. For example, a high amplitude signal is typically a signal with an amplitude which is greater than 10 dB below the peak value of $\tilde{h}[n]$ while a low amplitude signal is typically a signal with a relatively smaller amplitude. The selection of high amplitude signals generates a modified channel impulse response estimation signal $\tilde{h}1[n]$ containing only signals on the main paths. The FFT unit 206 calculates the FFT transformation of the $\tilde{h}1[n]$ from the selecting unit 204 to generate a channel frequency response estimation $\tilde{H}[k]$. The $\tilde{H}[k]$ provides the coefficient of the channel matched filter 68 and 114. The reserve main path unit 106 is not required, but does provide more reliable channel estimation.

Although specific embodiments have been illustrated and described, it will be obvious to those skilled in the art that various modifications may be made without departing from the spirit which is intended to be limited solely by the appended claims. For example, although FIGS. 3A, 3B, and 3C described the uplink receiver of the user 1, the similar process can be repeated for the data detection of the other user. Therefore, while the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A downlink receiver, comprising:
    a pilot interference cancellation unit for subtracting pilot signal interference from a FFT of a received baseband signal;
    a data signal spreading code matched filter for removing data signal spreading code from the output of the pilot interference cancellation unit;
    a pilot signal spreading code matched filter for removing pilot signal spreading code from the FFT of the received baseband signal;
    a channel matched filter for generating a channel frequency response estimation based on the output of the pilot signal spreading code matched filter and then generating a product of the output of the data signal spreading code matched filter and a complex conjugate of the channel frequency response estimation and finally calculating a block sum of the product within one spreading code period; and
    a decision unit for deciding a data value from the generated block sum based on a previously selected modulation type.

2. The downlink receiver of claim 1, wherein the pilot interference cancellation unit comprises:
    a pilot signal estimation unit for estimating a pilot signal component from the FFT of the received baseband signal; and
    a combiner for subtracting the estimated pilot signal component from the FFT of the received baseband signal.

3. The downlink receiver of claim 2, wherein the pilot signal estimation unit comprises:
    a delay unit for delaying the FFT of the received baseband signal by one spreading code period; and
    an averaging unit for performing a weighted block-by-block average of the delayed FFT of the received baseband signal.

4. The downlink receiver of claim 2, wherein the pilot signal estimation unit comprises:
    a delay unit for delaying the FFT of the received baseband signal by one spreading code period;
    a data signal reconstruction unit for reconstructing the data signal component based on the concept of data decision feedback;
    a pilot signal estimation combiner for subtracting the reconstructed data signal component from the delayed FFT of the received baseband signal; and an averaging unit for performing a weighted block-by-block average of the result of the pilot signal estimation combiner.

5. The downlink receiver of claim 1, wherein the data signal spreading code matched filter comprises:
   a storage unit for storing the FFT of a data signal spreading code;
   a complex conjugate unit for computing the complex conjugate of the FFT of the data signal spreading code; and
   a multiplier for multiplying the output of the pilot interference cancellation unit with the output of the complex conjugate unit.

6. The downlink receiver of claim 1, wherein a pilot signal spreading code matched filter comprises:
   a storage unit for storing the FFT of a pilot signal spreading code;
   a complex conjugate unit for computing the complex conjugate of the FFT of the pilot signal spreading code; and
   a multiplier for multiplying the FFT of the received baseband signal with the output of the complex conjugate unit.

7. The downlink receiver of claim 1, wherein the channel matched filter comprises a channel frequency response estimation unit for generating the channel frequency response estimation based on the output of the pilot signal spreading code matched filter, said channel frequency response estimation unit comprising:
   a delay unit for delaying the output of the pilot signal spreading code matched filter by one spreading code period;
   an averaging unit for performing a weighted block-by-block average of the delayed output of the pilot signal spreading code matched filter; and
   a complex conjugate unit for computing the complex conjugate of the weighted block-by-block average of the delayed output of the pilot signal spreading code matched filter.

8. The downlink receiver of claim 7, wherein the channel frequency response estimation unit comprises a reserve main-path unit to reserve main paths said reserve main-path unit comprising:
   an inverse fast Fourier transform (IFFT) unit for computing an IFFT of the weighted block-by-block average of the delayed output of the pilot signal spreading code matched filter to generate a channel impulse response estimation;
   a searching unit for finding peak amplitudes from the IFFT;
   a selecting unit for generating a main-path reserved channel impulse response estimation based on the found peak amplitudes; and
   a FFT unit for computing the FFT of the generated main-path reserved channel impulse response estimation.

9. The downlink receiver of claim 7, wherein the channel matched filter further comprises:
   a multiplier for multiplying the output of the data signal spreading code matched filter with the channel frequency response estimation; and
   a summer for calculating a block sum of the output of the multiplier within one spreading code period.

10. A method for downlink receiving, said method comprising:

subtracting pilot signal interference from a FFT of a received baseband signal;
removing a data signal spreading code from the FFT of a received baseband signal after the pilot signal interference substraction;
removing a pilot signal spreading code from the FFT of the received baseband signal;
generating a channel frequency response estimation from the FFT of the received baseband signal after removing the pilot signal spreading code;
generating a product of a complex conjugate of the channel frequency response estimation and the FFT of the received based signal after pilot signal interference subtraction and removing the data signal spreading code;
calculating a block sum of the product within on spreading code period; and
deciding a data value from the summed value based on a previously selected modulation type.

11. The method of claim 10, wherein subtracting pilot signal interference from the FFT of a received baseband signal comprises:
   estimating a pilot signal component from the FFT of the received baseband signal; and
   subtracting the estimated pilot signal component from the FFT of the received baseband signal.

12. The method of claim 11, wherein estimating the pilot signal component comprises:
   delaying the FFT of the received baseband signal by one spreading code period; and
   performing a weighted block-by-block average of the delayed FFT of the received baseband signal.

13. The method of claim 11, wherein estimating the pilot signal component comprises:
   reconstructing a data signal component from a previously received symbol;
   delaying the FFT of the received baseband signal by one spreading code period;
   subtracting the reconstructed data signal component from the delayed FFT of the received baseband signal; and
   performing a weighted block-by-block average of the delayed FFT of the received baseband signal after the subtraction of the reconstructed data signal component.

14. The method of claim 10, wherein removing data signal spreading code from the FFT of the received baseband signal after the pilot signal interference subtraction comprises:
   generating the FFT of a data signal spreading code;
   computing the complex conjugate of the FFT of the data signal spreading code; and
   multiplying the computed complex conjugate with the FFT of a received baseband signal after the pilot signal interference subtraction.

15. The method of claim 10, wherein removing pilot signal spreading code from the FFT of the received baseband signal comprises:
   generating the FFT of a pilot signal spreading code;
   computing the complex conjugate of the FFT of the pilot signal spreading code; and
   multiplying the FFT of the received baseband signal with the computed complex conjugate.

16. The method of claim 10, wherein estimating channel frequency response comprises:
   delaying the FFT of the received baseband signal by one spreading code period after removing the pilot signal spreading code;

performing a weighted block-by-block average of the delayed FFT of the received baseband signal after removing the pilot signal spreading code; and computing the complex conjugate of the weighted block-by-block average.

17. The method of claim 16, wherein estimating channel frequency response further comprises reserving main paths, reserving main paths comprises:

computing an inverse fast fourier transform (IFFT) of the weighted block-by-block average of the delayed FFT of the received baseband signal after removing the pilot signal spreading code to generate a channel impulse response estimation;

finding peak amplitudes from the computed IFFT;

generating a main-path reserved channel impulse response estimation based on the found peak amplitudes; and computing the FFT of the generated main-path reserved channel impulse response estimation.

18. The method of claim 16, wherein summing the product of the complex conjugate of the channel frequency response estimation and the FFT of the received base band signal within one spreading code period after pilot signal interference subtraction and removing the data signal spreading code further comprises:

multiplying the complex conjugate of the channel frequency response estimation with the FFT of the received baseband signal after pilot signal subtraction and removing the data signal spreading code; and performing a block sum of the product within one spreading code period.

19. A downlink receiver, comprising:

a pilot interference cancellation unit for subtracting pilot signal interference from a FFT of a received baseband signal;

a data signal spreading code matched filter for removing data signal spreading code from the output of the pilot interference cancellation unit;

a pilot signal spreading code matched filter for removing pilot signal spreading code of an estimated pilot signal component directly from the pilot interference cancellation unit;

a channel matched filter for generating the product of the output of the data signal spreading code matched filter and a complex conjugate of the channel frequency response estimation and finally calculating a block sum of the product within one spreading code period; and a decision unit for deciding a data value from the generated block sum based on a previously selected modulation type.

20. The downlink receiver of claim 19, wherein the pilot interference cancellation unit comprises:

a pilot signal estimation unit for estimating a pilot signal component from the FFT of the received baseband signal; and a combiner for subtracting the estimated pilot signal component from the FFT of the received baseband signal.

21. The downlink receiver of claim 20, wherein the pilot signal estimation unit comprises:

a delay unit for delaying the FFT of the received baseband signal by one spreading code period; and an averaging unit for performing a weighted block-by-block average of the delayed FFT of the received baseband signal.

22. The downlink receiver of claim 20, wherein the pilot signal estimation unit comprises:

a delay unit for delaying the FFT of the received baseband signal by one spreading code period;

a data signal reconstruction unit for reconstructing a data signal component based on a decision feedback method;

a pilot signal estimation combiner for subtracting the reconstructed data signal component from the delayed FFT of the received baseband signal; and an averaging unit for performing a weighted block-by-block average of the result of the pilot signal estimation combiner.

23. The downlink receiver of claim 19, wherein the channel matched filter comprises:

a complex conjugate unit for computing the complex conjugate of the channel frequency response estimation;

a multiplier for multiplying the output of the data signal spreading code matched filter with the output of the complex conjugate unit; and a summer for performing a block sum of the product of the multiplier within one spreading code period.

24. The downlink receiver of claim 23, wherein the channel matched filter further comprises a reserve main-path unit to reserve main paths, said reserve main-path unit comprising:

an inverse fast Fourier transform (IFFT) unit for computing an IFFT of the channel frequency response estimation to generate a channel impulse response estimation;

a searching unit for finding peak amplitudes from the IFFT;

a selecting unit for generating a main-path reserved channel impulse response estimation based on the found peak amplitudes; and a FFT unit for computing the FFT of the generated main-path reserved channel impulse response estimation.

25. An uplink receiver for data detection of received symbols, comprising:

a multi-user interference cancellation unit for subtracting estimated interference signals from a FFT of a received baseband signal;

a data signal spreading code matched filter for removing data signal spreading code from the FFT of a received baseband signal after estimated interference signals subtraction;

a pilot signal spreading code matched filter for removing pilot signal spreading code from the FFT of the received baseband signal after estimated interference subtraction;

a switch connected between the multi-user interference cancellation unit and the pilot signal spreading code matched filter that closes when the last stage data detection of the present received symbol is reached;

a channel matched filter for generating a channel frequency response estimation based on the output of the pilot signal spreading code matched filter and then generating a product of the output of the data signal spreading code matched filter and a complex conjugate of the channel frequency response estimation and finally calculating a block sum of the product within one spreading code period; and a decision unit for deciding a tentative data value and a final data value from the generated block sum based on a previously selected modulation type; and an interference signal estimation unit for generating an estimated interference signal for interference cancellation by other users based on the channel frequency response estimation, the FFT's of the pilot and data signal spreading codes, and the decided tentative data value.

26. The uplink receiver of claim 25, wherein the multi-user interference cancellation unit comprises:
a first adder for summing the estimated interference signals from other receivers; and
a second adder for subtracting the summed estimated interference signals from the FFT of the received baseband signal.

27. The uplink receiver of claim 25, wherein the data signal spreading code matched filter comprises:
a storage unit for storing the FFT of a data signal spreading code;
a complex conjugate unit for computing the complex conjugate of the FFT of the data signal spreading code; and
a multiplier for multiplying the output of the multi-user interference cancellation unit with the output of the complex conjugate unit.

28. The uplink receiver of claim 25, wherein the pilot signal spreading code matched filter comprises:
a storage unit for storing the FFT of a pilot signal spreading code;
a complex conjugate unit for computing a complex conjugate of the FFT of the pilot signal spreading code; and
a multiplier for multiplying the output of the multi-user interference cancellation unit at the last stage data detection with the output of the complex conjugate of the FFT of the pilot signal spreading code.

29. The uplink receiver of claim 25, wherein the channel matched filter comprises a channel frequency response estimation unit for generating the channel frequency response estimation based on the output of the pilot signal spreading code matched filter, said channel frequency response estimation unlit comprising:
a delay unit for delaying the output of the pilot signal spreading code matched filter by one spreading code period;
an averaging unit for performing a weighted block-by-block average of the delayed output of the pilot signal spreading code matched filter; and
a complex conjugate unit for computing a complex conjugate of the weighted block-by-block average of the delayed output of the pilot signal spreading code matched filter.

30. The uplink receiver of claim 29, wherein the channel frequency response estimation unit comprises a reserve main-path unit to reserve main paths, said reserve main-path unit comprising:
an inverse fast Fourier transform (IFFT) unit for computing an IFFT of the weighted block-by-block average of the delayed output of the pilot signal spreading code matched filter to generate a channel impulse response estimation;
a searching unit for finding peak amplitudes of the IFFT;
a selecting unit for generating a main-path reserved channel impulse response estimation based on the found peak amplitudes; and
a FFT unit for computing the FFT of the generated main-path reserved channel impulse response estimation.

31. The downlink receiver of claim 29, wherein the channel matched filter further comprises:
a multiplier for multiplying the output of the data signal spreading code matched filter with the complex conjugate of the channel frequency response estimation; and
a summer for calculating a block sum of the output of the multiplier within one spreading code period.

32. The uplink receiver of claim 25, wherein the interference signal estimation unit comprises:
a first multiplier for multiplying the FFT of data signal spreading code signal with a the tentative data decision;
an adder for summing the output of the first multiplier with the FFT of the pilot signal spreading code; and
a second multiplier for multiplying the channel frequency response estimation with the product of the adder; and
a normalization unit for normalizing the output of the second multiplier by the square norm of the FFT of the pilot signal spreading code.

* * * * *

UNITED STATES PATENT AND TRADEMARK OFFICE
CERTIFICATE OF CORRECTION

PATENT NO. : 6,154,443
DATED : November 28, 2000
INVENTOR(S) : C.-C. Huang et al.

It is certified that error appears in the above-identified patent and that said Letters Patent is hereby corrected as shown below:

| COLUMN | LINE | |
|---|---|---|
| [56]<br>Pg. 1, col. 1 | Refs. Cited<br>(Other Publs.,<br>Item 1) | "D et al.," should read --D. et al.,-- |
| [56]<br>Pg. 1, col. 1 | Refs. Cited<br>(Other Publs.,<br>Item 1) | "*MILCOM.,*" should read --*MILCOM,*-- |
| [56]<br>Pg. 1, col. 1 | Refs. Cited<br>(Other Publs.,<br>Item 2) | "V45," should read --Vol. 45,-- |
| [57]<br>Pg. 1, col. 2 | Abstract<br>12 of text | "combine" should read --combines-- |
| [57]<br>Pg. 1, col. 2 | Abstract<br>14 of text | "a interference" should read --an interference-- |
| 11<br>(Claim 8, | 43<br>line 3) | "paths said" should read --paths, said-- |
| 12<br>(Claim 10, | 5<br>line 7) | "substraction;" should read --subtraction;-- |
| 12<br>(Claim 10, | 13<br>line 15) | "based" should read --baseband-- |

UNITED STATES PATENT AND TRADEMARK OFFICE
CERTIFICATE OF CORRECTION

PATENT NO. : 6,154,443             Page 2 of 2
DATED      : November 28, 2000
INVENTOR(S) : C.-C. Huang et al.

It is certified that error appears in the above-identified patent and that said Letters Patent is hereby corrected as shown below:

COLUMN        LINE

12                16            "on" should read --one--
(Claim 10,   line 18)

13                 8            "reserving" should read --and reserving--
(Claim 17,   line 3)

13                 9            "fourier" should read --Fourier--
(Claim 17,   line 4)

13                23            "base band" should read --baseband--
(Claim 18,   line 3)

13                44            "the product" should read --a product--
(Claim 19,   line 12)

15                18            "the complex" should read --a complex--
(Claim 27,   line 5)

15                40            "unlit" should read --unit--
(Claim 29,   line 6)

UNITED STATES PATENT AND TRADEMARK OFFICE
CERTIFICATE OF CORRECTION

PATENT NO. : 6,154,443
DATED : November 28, 2000
INVENTOR(S) : C.-C. Huang et al.

It is certified that error appears in the above-identified patent and that said Letters Patent is hereby corrected as shown below:

COLUMN    LINE

16    34    "code signal with a the" should read --code with the--
(Claim 32, line 4)

Signed and Sealed this

Twenty-fourth Day of April, 2001

Attest:

NICHOLAS P. GODICI

Attesting Officer    Acting Director of the United States Patent and Trademark Office